United States Patent [19]

Katchka

[11] Patent Number: 5,396,213

[45] Date of Patent: * Mar. 7, 1995

[54] CONTROL DEVICE, PARTS THEREFOR AND METHODS OF MAKING THE SAME

[75] Inventor: Jay R. Katchka, Cypress, Calif.

[73] Assignee: Robertshaw Controls Company, Richmond, Va.

[ * ] Notice: The portion of the term of this patent subsequent to Mar. 15, 2011 has been disclaimed.

[21] Appl. No.: 173,348

[22] Filed: Dec. 23, 1993

Related U.S. Application Data

[62] Division of Ser. No. 81,082, Jun. 22, 1993, Pat. No. 5,294,907.

[51] Int. Cl.$^6$ .......................................... H01M 37/46
[52] U.S. Cl. ..................... 337/393; 337/394; 337/388
[58] Field of Search ............... 337/393, 394, 123, 382, 337/388, 380; 29/623

[56] References Cited

U.S. PATENT DOCUMENTS

3,774,136 11/1973 Zelenka ..................... 337/382

Primary Examiner—Lincoln Donovan
Attorney, Agent, or Firm—Candor, Candor & Tassone

[57] ABSTRACT

A control device, parts therefor and methods of making the same are provided, the control device having a temperature sensing unit comprising a rod and tube means utilizing a heat expandable and contractible polymeric member disposed between one end of the rod and an abutment of the tube to tend to cause an outer end of the rod to move toward an actuator of the control device upon the unit sensing decreasing temperature and to tend to cause that end of the rod to move away from the actuator upon the unit sensing increasing temperature, a biasing member being operatively interconnected to the unit to continuously place the tube under compression between an open end thereof and the abutment thereof and to continuously place the rod under tension between the opposite ends thereof to tend to reduce the temperature differential of the control device.

14 Claims, 4 Drawing Sheets

CONTROL DEVICE, PARTS THEREFOR AND METHODS OF MAKING THE SAME

CROSS REFERENCE TO RELATED APPLICATIONS

This application is a divisional of Ser. No. 081,082, filed Jun. 22, 1993, now U.S. Pat. No. 5,294,907.

BACKGROUND OF THE INVENTION

1. Field of the Invention

This invention relates to a new control device, such as for controlling the burner means of a water heater, and to new parts for such a control device as well as to new methods of making such a control device and such new parts therefor.

2. Prior Art Statement

It is known to provide a control device comprising a housing means provided with actuator means therein, and a temperature sensing unit carried by the housing means for operating the actuator means in response to temperature sensed by the unit, the unit comprising a tubular member having an open end secured to the housing means and having another end disposed remote from the housing means, the unit comprising a rod means disposed in the tubular member and having a first end projecting out of the open end of the tubular member and engaging the actuator means, the rod means having a second end disposed adjacent the other end of the tubular member, the tubular member having abutment means disposed between the ends thereof, the unit comprising a heat expandable and contractible polymeric member disposed between the second end of the rod means and the abutment means to tend to cause the first end of the rod means to move toward the actuator means upon the unit sensing decreasing temperature and to tend to cause the first end of the rod means to move away from the actuator means upon the unit sensing increasing temperature. For example, see the U.S. Pat. No. to Katchka et al, 3,691,501.

SUMMARY OF THE INVENTION

It is one of the features of this invention to provide a new control device of the rod and tube temperature sensing type wherein the temperature differential of the control device is relatively small in comparison with the temperature differentials of prior known control devices having rod and tube units.

In particular, it was found according to the teachings of this invention that by uniquely forming and arranging the parts of the temperature sensing unit, the undesirable resiliency of the operating parts thereof is substantially eliminated or taken out so as to cause the control device utilizing the unit to operate with a low temperature differential.

For example, it was found that by tending to continuously place the tubular member under compression between the open end thereof and an intermediate abutment means thereof and to continuously place the rod means under tension between the ends thereof of a rod and tube arrangement wherein a heat expandable and contractible polymeric member is utilized, such unwanted resiliency is substantially eliminated or taken out of the temperature sensing unit.

Accordingly, one embodiment of this invention comprises a control device comprising a housing means provided with actuator means therein, and a temperature sensing unit carried by the housing means for operating the actuator means in response to temperature sensed by the unit, the unit comprising a tubular member having an open end secured to the housing means and having another end disposed remote from the housing means, the unit comprising a rod means disposed in the tubular member and having a first end projecting out of the open end of the tubular member and engaging the actuator means, the rod means having a second end disposed adjacent the other end of the tubular member, the tubular member having abutment means disposed between the ends thereof, the unit comprising a heat expandable and contractible polymeric member disposed between the second end of the rod means and the abutment means to tend to cause the first end of the rod means to move toward the actuator means upon the unit sensing decreasing temperature and to tend to cause the first end of the rod means to move away from the actuator means upon the unit sensing increasing temperature, and means operatively interconnected to the unit to continuously place the tubular member under compression between the open end thereof and the abutment means thereof and to continuously place the rod means under tension between the ends thereof.

Therefore, it is an object of this invention to provide a new control device having one or more of the novel features of this invention as set forth above or hereinafter shown or described.

Another object of this invention is to provide a new method of making such a control device, the method of this invention having one or more of the novel features of this invention as set forth above or hereinafter shown or described.

Another object of this invention is to provide a new part for such a control device, the new part of this invention having one or more of the novel features of this invention as set forth above or hereinafter shown or described.

Another object of this invention is to provide a new method of making such a new part, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

While the various features of this invention are hereinafter illustrated and described as being particularly adapted to provide a control device for a water heater, it is to be understood that the various features of this invention can be utilized singly or in various combinations thereof to provide control devices for other apparatus as desired.

Therefore, this invention is not to be limited to only the embodiment illustrated in the drawings, because the drawings are merely utilized to illustrate one of the wide variety of uses of this invention.

Figures 1, 2:
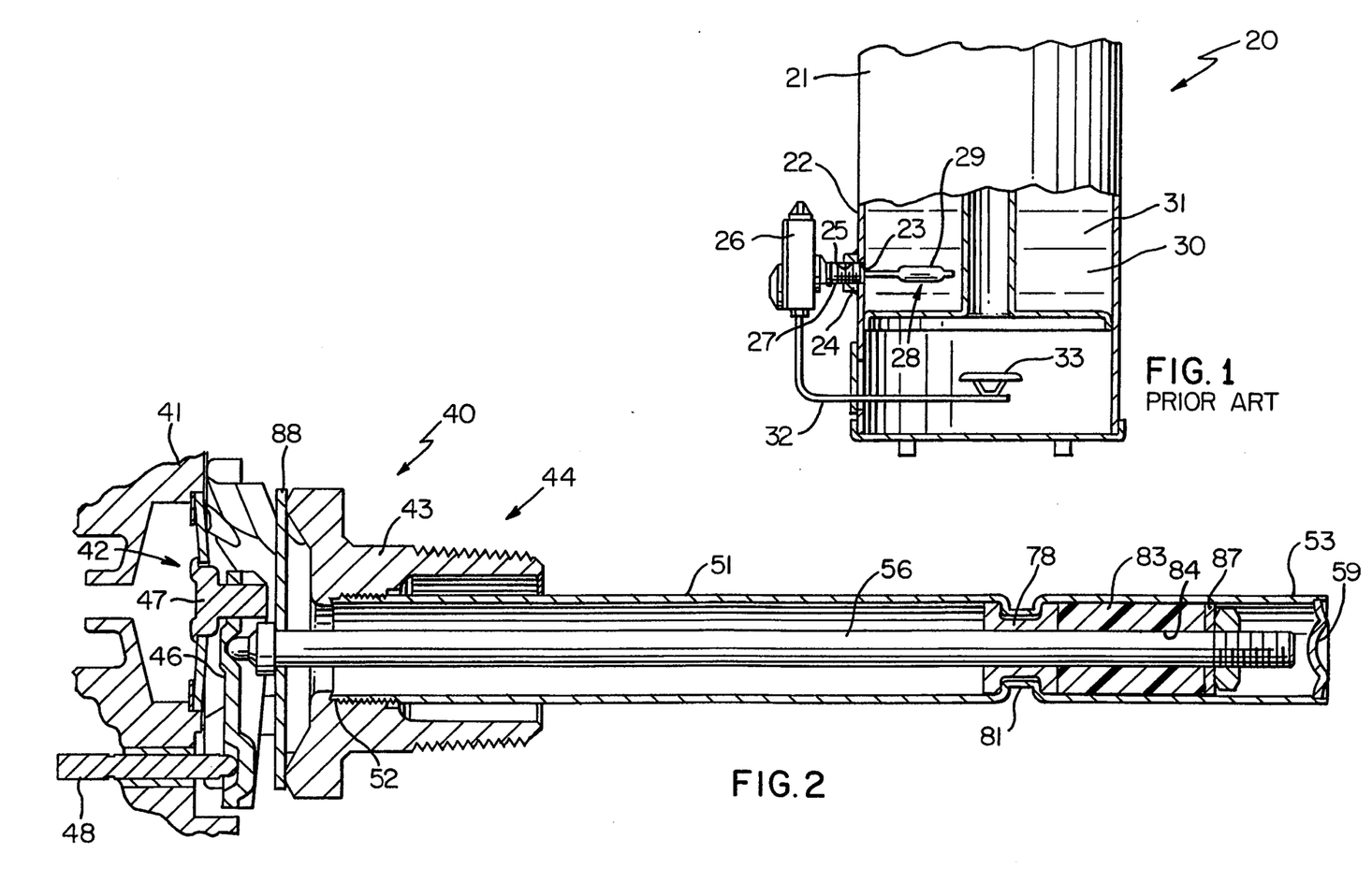
FIG. 1 is a fragmentary schematic view, partially in cross section, illustrating a prior known control device mounted to a water heater to control the burner means thereof.
FIG. 2 is a fragmentary cross-sectional view illustrating the new control device of this invention.

Referring now to FIG. 1, a prior known water heater is generally indicated by the reference numeral 20 and comprises a tank 21 having a wall means 22 provided with an opening 23 and having an internally threaded spud 24 secured thereto with its internally threaded opening 25 in aligned relation with the opening 23 of the wall means 22. A control device 26 has an externally threaded shank 27 threaded into the threaded opening 25 of the spud 24 so that a temperature sensing unit, that is generally indicated by the reference numeral 28, of the control device 26 has a tube means 29 thereof located in the water 30 contained within a chamber 31 of the tank 21 so as to sense the temperature thereof, the control device 26 having conventional means for interconnecting a fuel source (not shown) with an outlet conduit means 32 that leads to a burner means 33 for burning gaseous fuel to heat the water 30 in the tank 21 when the temperature thereof as sensed by the temperature sensing unit 28 is below a set point setting of the control device 26 and to terminate the flow of fuel to the burner means 33 when the temperature sensing unit 28 senses that the temperature of the water 30 is above the set point temperature setting of the control device 26.

As is well known, the temperature being sensed to cause the control device 26 to turn on the burner means 33 and the temperature being sensed to cause the control device 26 to turn off the burner means 33 are different for each set point setting of the control device 26 and such difference is called the temperature differential of the control device 26. It is also well known that it is desired to have the temperature differential of a control device be in a desired small or low range thereof that enhances the operation thereof, such as when the control device is controlling the temperature of the water in the water heater at low temperature settings of the control device. For example, it is well known that conventional rod and tube temperature sensing arrangements similar to the temperature sensing unit 28 provide temperature differentials in the range of 15° F. to 20° F. for the control devices utilizing the same.

In contrast, one working embodiment of the temperature sensing unit of this invention as hereinafter described operates its associated control device with a temperature differential of approximately 8° F. to 10° F.

Conventional rod and tube temperature sensing units each utilize a tube made of material having a high coefficient of thermal expansion and a rod made of a material having a low coefficient of thermal expansion, the rod normally being fixed at a closed end of the tube such that with an increase in heat, the tube expands and the rod is withdrawn or pulled into the tube and with a decrease in heat, the tube contracts and the rod is advanced or moved out of the tube.

It is well known from the aforementioned U.S. Pat. No. to Katchka et al, 3,691,501, that a rod and tube arrangement can be provided that utilizes a heat expandable and contractible polymeric member in combination with the tubular member and the rod means thereof and since the temperature sensing means of this invention is directed to a unique arrangement of this type of temperature sensing unit, this U.S. patent is being incorporated into this disclosure by this reference thereto.

Therefore, since the details of a control device and its operation in controlling the temperature of the water in a water heater tank in response to movement of an end of a rod means of a rod and tube temperature sensing unit of the heat expandable and contractible polymeric insert type are well known from the aforementioned U.S. Pat. No. to Katchka et al, 3,691,501, only the details of the control device of this invention believed necessary to understand the unique features of this invention will now be set forth.

In particular, reference is now made to FIGS. 2–6 wherein the new control device of this invention is generally indicated by the reference numeral 40 and comprises a housing means 41 provided with actuator means therein that is generally indicated by the reference numeral 42, the housing means 41 comprising two parts 42' and 43 with the part 43 being a shank that is secured to the housing part 42' by threaded fastening members (not shown) in a manner well known in the art and forming a housing means for a temperature sensing unit of this invention that is generally indicated by the reference numeral 44 and comprising part of the control device 40 as will be apparent hereinafter.

The shank 43 of the control device 40 has an externally threaded portion 45 for threading into the spud of a water heater in a manner similar to the threaded shank 24 of the control device 26 previously described so that the control device 40 will be carried by such water heater to control the burner means thereof in relation to the temperature being sensed by the temperature sensing unit 44.

Figure 3:
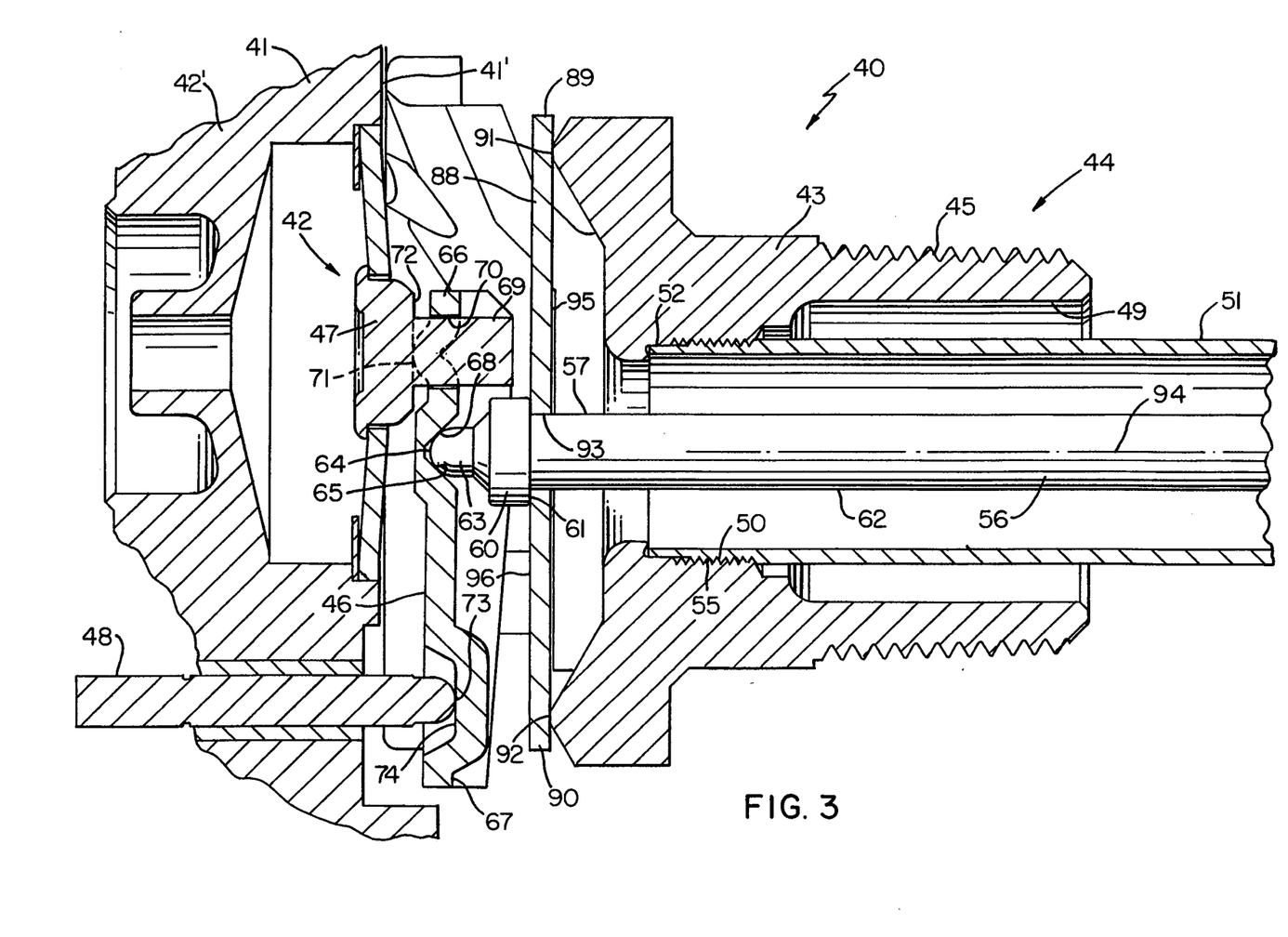
FIG. 3 is an enlarged fragmentary cross-sectional view of the left-hand portion of the control device of FIG. 2.

The actuator means 42 of the control device 40 comprises a pivotally mounted lever 46 and a thrust button 47, the actuator means 42 further comprising an adjustable temperature setting and axially movable pin means 48 whereby the thrust button 47 controls conventional clicker means (not shown) of the actuator means 42 for opening a valve means (not shown) in the housing means 41 to direct fuel to the burner means when the thrust button 47 is moved to the left in FIG. 3 a certain amount and which closes the valve means when the thrust button 47 is moved to the right in FIG. 3 a certain amount all in a manner well known in the art. For example, see the U.S. Pat. No. to Katchka, 3,860,170 and the U.S. Pat. No. to Dykzeul, 4,235,323, whereby these two patents are also being incorporated into this disclosure by this reference thereto.

The shank 43 of the control device 40 has an opening means 49 passing therethrough, the opening means 49 defining an internally threaded portion 50 and leading to the actuator means 42 as will be apparent hereinafter.

The temperature sensing unit 44 comprises a tubular member 51 formed of any suitable material, such as copper, that has a relatively high coefficient of thermal expansion and is provided with opposite ends 52 and 53, the tubular member 51 having an abutment means that is generally indicated by the reference numeral 54 formed intermediate the ends 52 and 53 thereof for a purpose hereinafter set forth.

The end 52 of the tubular member 51 is externally threaded in the area 55 thereof so that the tubular member 51 can be threaded into the threaded portion 50 of the shank 43 to be secured thereto whereby the end 52 of the tubular member 51 is open to the actuator means 42 for a purpose hereinafter set forth.

The temperature sensing unit 44 comprises a rod means 56 formed of any suitable material having a low coefficient of thermal expansion, such as invar, and having opposed ends 57 and 58, the rod means 56 being disposed in the tubular member 51 so that the end 57 thereof projects out of the open end 52 thereof for engagement with the lever 46 of the actuating means 42 while the end 58 thereof is disposed adjacent the end 53 of the tubular member 51.

The other end 53 of the tubular member 51 is adapted to be closed by a plug 59 that is formed of any suitable material, the plug 59 being disposed in place after the rod means 56 has been calibrated in the tubular member 51 as will be apparent hereinafter.

The end 57 of the rod means 56 has an annular flange or disc-like section 60 defining an annular shoulder means 61 that extends radially outwardly from a substantially cylindrical body portion 62 of the rod means 56.

The end 57 of the rod means 56 also has a projection 63 extending beyond the flange means 60 and terminates at a semi-spherical wall 64 that is adapted to be received in a recess 65 formed in the lever 46 intermediate the ends 66 and 67 thereof as illustrated, the recess 65 in the lever 46 defining an annular beveled surface 68 which is engaged by the rounded surface 64 of the projection 63 of the rod means 56 in a manner well known in the art. For example, see the aforementioned U.S. Pat. No. to Katchka et al, 3,691,501.

The thrust button 47 of the actuator means 42 has a projection 69 extending through an opening 70 in the end 66 of the lever 46 so that an arcuate ribbed surface 71 of the lever 46 will engage against an annular surface 72 of the thrust button 47 that surrounds the projection 69 thereof.

In this manner, the temperature adjustment member 48 has an end 73 thereof bear against a recessed surface 74 in the end 67 of the lever 46 and thereby adjust the pivoted position of the lever 46 on the end 57 of the rod means 56, the actuator means 42 having a spring bias in a direction tending to move the thrust button 47 to the right in FIG. 3 so as to always maintain contact of the surface 68 of the lever 46 with the surface 64 of the rod means 56.

Figure 4:
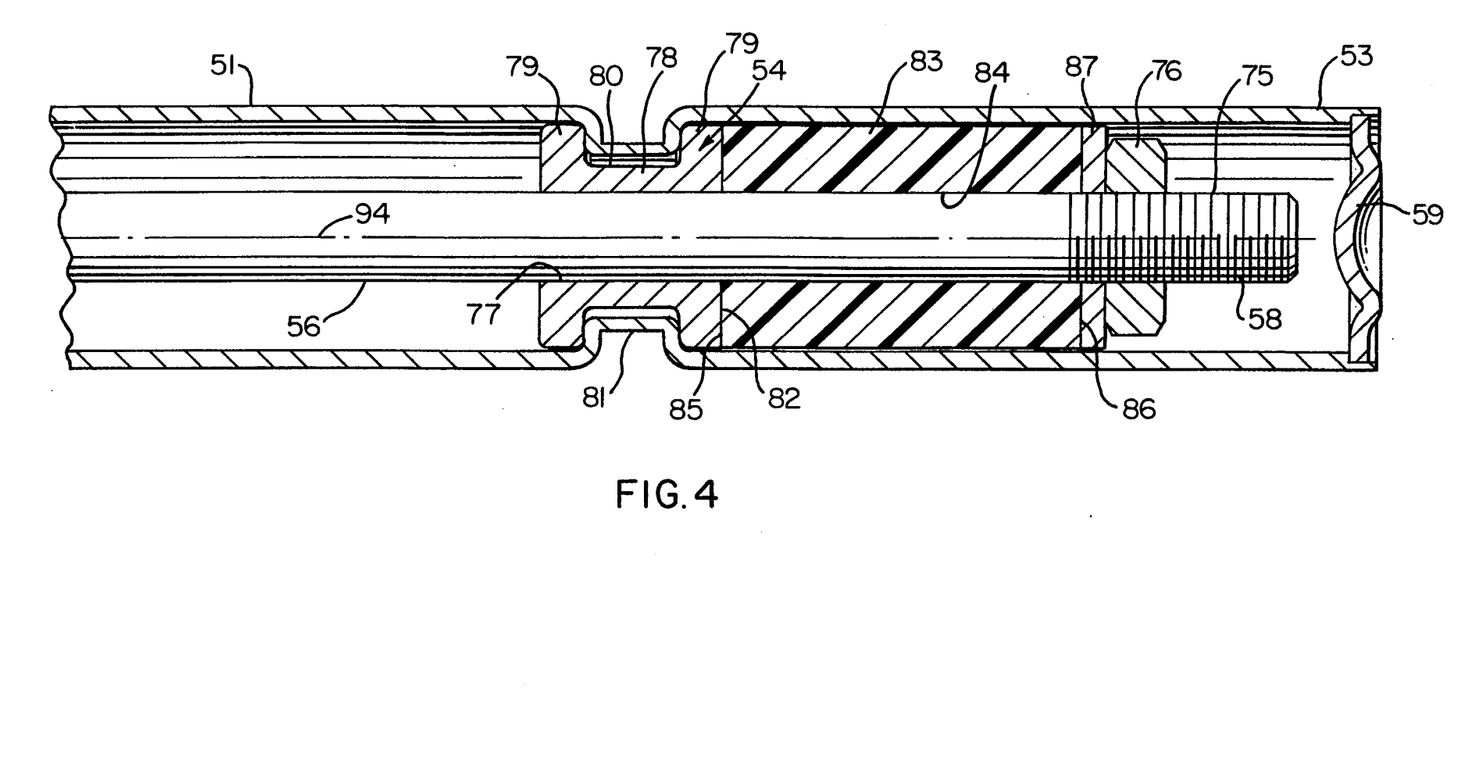
FIG. 4 is an enlarged fragmentary view of the right-hand portion of the control device of FIG. 2.
Figure 5:
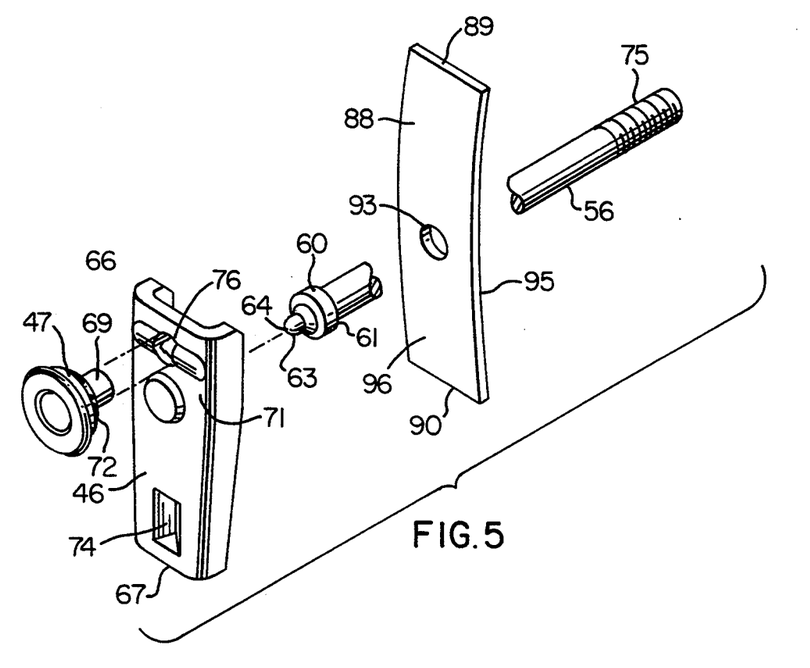
FIG. 5 is an exploded perspective view of certain parts of the temperature sensing unit of the control device of FIGS. 2-4.

The other end 58 of the rod means 56 has external threads 75 for threadedly receiving a nut 76 thereon as illustrated in FIG. 4.

However, before the nut 76 is threadedly disposed on the end 58 of the rod means 56, the rod means 56 is assembled with the tubular member 51 by inserting the end 58 through the open end 52 of the tubular member 51 so as to pass through a central opening 77 of a spool-like member 78 having annular flanges 79 disposed on opposite sides of an annular recess 80 thereof, the annular flanges 79 having a diameter permitting the same to be disposed in the tubular member 51 and be positioned in a desired location therein whereby an annular section 81 of the tubular member 51 is deformed radially inwardly into the recess 80 of the spool member 78 to fasten the same in the desired intermediate location thereof so that the spool 78 and annular deformation 81 define the abutment means 54 that has an annular face or annular shoulder 82 that faces toward the end 53 of the tubular member 51.

Thereafter, an insert 83 of a heat expandable and contractible polymeric material, such as silicon rubber as set forth in the aforementioned U.S. Pat. No. to Katchka et al, 3,691,501, that is in tubular form is inserted over the end 58 of the rod means 56 by receiving the end 58 of the rod means 56 in an axial opening 84 passing through the insert 83 and centrally interrupting the opposed flat ends 85 and 86 thereof. The insert 83 is telescoped onto the rod means 56 until the surface 85 thereof abuts against the annular shoulder 82 of the abutment means 54 of the tubular member 51. A washer of any suitable material 87 is then telescoped on the end 58 of the rod means 56 and then the nut 76 is threaded on the end 58 until the disc or washer 87 is disposed against the surface 86 of the element 83 whereby the element 83 is disposed in stacked relation between the surface 82 of the abutment means 54 and the disc or washer 87 as illustrated.

However, before the rod means 56 has been so telescoped into the tubular member 51, a spring beam member 88 formed of any suitable material, such as metallic material, has its opposed ends 89 and 90 disposed against fulcrum surfaces 91 and 92 formed on the shank 43 so that a central opening 93 passing through the spring beam member 88 is disposed coaxial with the longitudinal axis 94 of the tubular member 51 as illustrated. The spring beam member 88 has a normal bow between the ends 89 and 90 thereof so that the concave side 95 of the spring beam member 88 faces the open end 52 of the tubular member 51.

Figure 6:
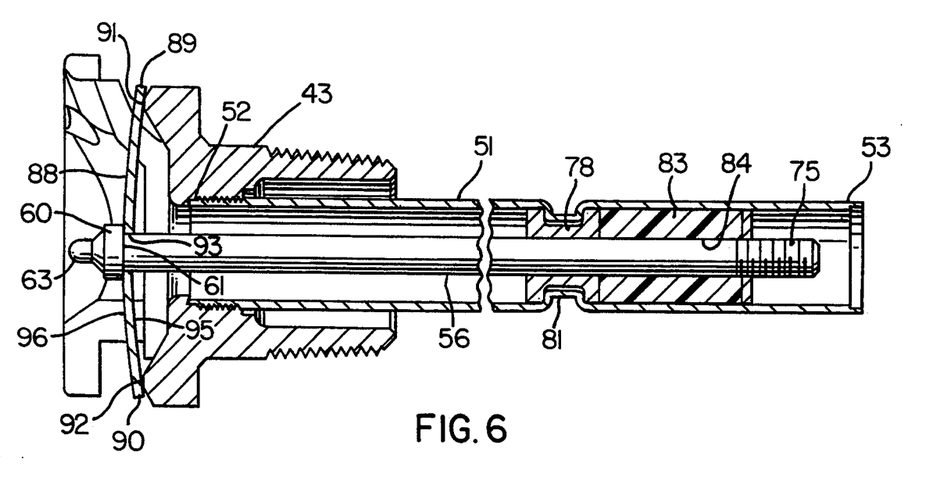
FIG. 6 is a reduced cross-sectional view of the temperature sensing unit of the control device of FIGS. 2-5 and illustrates one step in the method of making the temperature sensing unit of this invention.

Once the spring beam member 88 is disposed in place, the rod means 56 has the end 58 thereof inserted through the opening 93 to be passed through the spring beam member 88 and into the tubular member 51 in the manner previously described until the annular shoulder 61 of the flange means 60 of the rod means 56 engages against the convex side 96 of the spring beam member 88 as illustrated in FIG. 6.

Thereafter when it is desired to dispose the nut 76 on the end 58 of the rod means 56 after the insert 83 and disc 87 have been disposed in place thereon, the rod means 56 through suitable automatic assembly machinery or the like is urged to the right in the drawings to cause the spring beam member 88 to be flattened from the bow shape thereof to a predetermined flattened condition thereof for providing a predetermined spring force tending to move the rod means 56 to the left in the drawings at which time the nut 76 is tightened in place to compact the insert 83 between the abutment means 54 and the disc 87 so that the natural force of the spring beam member 88 will thereafter tend to move the rod means 56 to the left in the drawings and be prevented from accomplishing the same as the insert 83 is disposed against the surface 82 of the abutment means 54, this spring force uniquely continuously placing the rod means 56 under tension between the ends 57 and 58 thereof while simultaneously and continuously placing the tubular member 51 under compression from the abutment means 54 to the end 52 thereof. It is believed that this unique arrangement removes or substantially eliminates the unwanted resiliency of the temperature sensing unit 44 and in combination with the amplifying action of the polymeric insert 83 provides for a low temperature differential operation of the actuator means 42 of the control device 40 in a manner hereinafter described. Also, it can be seen that the prestressed or flattened spring beam member 88 will provide the spring force of the temperature sensing unit 44 that is needed to overcome the spring force of the clicker means of the actuator means 42 to open the valve means for fuel flow when the temperature sensing unit 44 is sensing a temperature below the set temperature of the control device 40.

Thus, it can be seen that the temperature sensing unit 44 can be calibrated or adjusted by the nut 76 so that for a particular temperature being sensed by the unit 44, the end surface 64 of the end 57 of the rod means 56 will be at a particular distance to the left from the fulcrum surfaces 91 and 92 and, thereby, will subsequently contact the surface 68 of the actuator lever 46 at a particular point when the shank 43 is fastened to the surface 41' of the housing part 41. After the nut 76 has been threaded on the end 58 of the rod means 56 to its final adjusted position for the reasons previously set forth, the nut 76 can be locked in place by any suitable means, such as by adhesive means, and then the plug 59 is secured in place to seal closed the end 53 of the tubular member 51.

While copper material has been previously mentioned for forming the tubular member 51 and invar for forming the rod means 56, it is to be understood that any suitable materials can be provided for the tubular member 51 and rod means 56, as desired.

Therefore, it can be seen that it is a relatively simple method of this invention to make the temperature sensing unit 44 and thereafter attach the temperature sensing unit 44 to the housing member 42' to complete the control device 40 that can then be calibrated in the normal manner so as to be adapted to operate in a manner now to be described.

When the control device 40 has been made by the method of this invention in the manner previously set forth and subsequently assembled to a water heater, the operator adjusts the pin 48 in a conventional manner to select a desired set point temperature for the control device 40 whereby should the temperature of the water in the water heater tank fall below the selected set point temperature a certain amount, the insert 83 will have contracted so that the force of the spring beam 88 tending to move the rod means 56 to the left in the drawings has now moved the rod means 56 to the left a distance sufficient to cause the lever 46 to pivot on the end 73 of the rod 48 in a counterclockwise direction so that the end 66 pushes the thrust button 47 to the left and causes actuation of the actuator means 42 to open the valve means to feed fuel to the burner means for heating the water in the water heater. Conversely, when the temperature of the water in the water heater rises above the selected set point temperature a certain amount, the insert 83 has axially expanded in such a manner that the same moves the rod means 56 to the right in the drawings in opposition to the force of the spring beam 88 whereby the movement of the end 57 of the rod means 56 to the right causes the lever 46 to pivot on the end 73 of the rod 48 in a clockwise direction so that the thrust button 47 follows the same and thus, moves to the right and thereby at a certain point causes the actuator means 42 to close the valve means to cease feeding fuel to the burner means that has been heating the water in the water heater.

In this manner, the control device 40 is adapted to cycle the burner means for the water heater on and off in a manner to tend to maintain the temperature of the water therein at the selected set point temperature, the difference between the actual temperature of the element 83 that causes the actuator means 42 to open the fuel valve means and the actual temperature of the element 83 that causes the actuator means 42 to cease to send fuel to the burner means being the temperature differential of the control device 40 and, as previously stated, such temperature differential in one working embodiment of this invention was found to be in the low range of approximately 8° F. to approximately 10° F. As previously stated it is believed that this low temperature differential is provided by the combination of the amplifying action of the polymeric insert 83 and the fact that the spring beam 88 continuously places the tubular member 51 under compression between the open end 52 thereof and the abutment means 54 and to continuously place the rod means 56 under tension between the ends 57 and 58 thereof so that the unwanted resiliency thereof has been removed or eliminated from the temperature sensing unit 44 of this invention. In fact, it may be found that it may be necessary to add a little resiliency in the clicker mechanism that forms part of the actuator means 42 to replace some of the removed resiliency of the temperature sensing unit 44 that has been provided in the past by the prior known rod and tube arrangements.

While it is believed that the parts for the temperature sensing unit 44 of this invention can have any suitable dimensions, in one working embodiment thereof the insert 83 comprises a silicon rubber that is sold by Dow Corning Corporation of Midland, Mich. as silicon rubber No. 747 and is approximately ½ inch in diameter, approximately ¾ of an inch long and has a hole 84 therethrough of approximately 3/16ths of an inch. The spring beam member 88 comprises heat treated 1095 steel and is approximately 1.5 inches in length, approximately 0.590 of an inch wide and approximately 0.078 of an inch thick while the distance between the fulcrums 91 and 92 is approximately 1.420 inches. The spring beam member 88, when prestressed or flattened during assembly thereof in the unit 44, exerts a spring force of approximately 100 pounds. The rod means 56 is approximately 3/16ths of an inch in diameter, is approximately 4-½ inches long and is formed of invar. The tubular member 51 is approximately 3-¾ inches long, has an outside diameter of approximately 9/16ths of an inch, has a wall thickness of approximately 0.030 of an inch and is formed of copper material.

While a high limit electrical switch means for the temperature sensing unit 44 of this invention has not been illustrated or described, it is to be understood that such a high limit electrical switch means would be located in the tubular member 51 and have the electrical leads thereof passing out of the open end 52 thereof and out of the shank 43 in an appropriate manner and as fully set forth in the aforementioned U.S. Pat. No. to Katchka et al, 3,691,501.

Thus, if the abutment means 54 in the tubular member 51 is lost, i.e., breaks loose, the rod means 56 will be driven to the left by the force of the spring beam 88 to open the valve means of the control device 40. However, since the high limit switch is set to stop the operation of the control device 40 when a high temperature limit, such as 200° F. is reached, the control device 40 will terminate the flow of fuel to the burner means of the water heater.

Thus, it can be seen that this invention not only provides a new control device and a new method of making the same, but also this invention provides a new temperature sensing unit for the control device and a new method of making the new temperature sensing unit.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a temperature sensing unit comprising a housing means for being secured to desired structure, a tubular member having an open end secured to said housing means and having another end disposed remote from said housing means, a rod means disposed in said tubular member and having a first end projecting out of said open end of said tubular member, said rod means having a second end disposed adjacent said other end of said tubular member, said tubular member having abutment means disposed between said ends thereof, and a heat expandable and contractible polymeric member disposed between said second end of said rod means and said abutment means to tend to cause said first end of said rod means to move away from said open end of said tubular member upon said unit sensing decreasing temperature and to tend to cause said first end of said rod means to move toward said open end of said tubular member upon said unit sensing increasing temperature, the improvement comprising the step of operatively interconnecting biasing means to said unit to continuously place said tubular member under compression between said open end thereof and said abutment means thereof and to continuously place said rod means under tension between said ends thereof.

2. A method of making a unit as set forth in claim 1 wherein the step of operatively interconnecting said biasing means to said unit comprises the steps of disposing said biasing means in said unit, and then prestressing said biasing means to a certain condition thereof that places said tubular member under a certain compressed condition thereof and that places said rod means under a certain tensioned condition thereof at that particular time and temperature.

3. A method of making a unit as set forth in claim 1 and comprising the step of forming said housing means to comprise a shank for a water heater control device and have means adapted to be interconnected to a water heater so that said other end of said tubular member is adapted to be disposed in the water contained in said water heater.

4. A method of making a unit as set forth in claim 1 and comprising the step of operatively interconnecting said biasing means to said first end of said rod means.

5. In a method of making a temperature sensing unit comprising a housing means for being secured to desired structure, a tubular member having an open end secured to said housing means and having another end disposed remote from said housing means, a rod means disposed in said tubular member and having a first end projecting out of said open end of said tubular member, said rod means having a second end disposed adjacent said other end of said tubular member, said tubular member having abutment means disposed between said ends thereof, and a heat expandable and contractible polymeric member disposed between said second end of said rod means and said abutment means to tend to cause said first end of said rod means to move away from said open end of said tubular member upon said unit sensing decreasing temperature and to tend to cause said first end of said rod means to move toward said open end of said tubular member upon said unit sensing increasing temperature, the improvement comprising the steps of operatively interconnecting biasing means to said unit to continuously place said tubular member under compression between said open end thereof and said abutment means thereof and to continuously place said rod means under tension between said ends thereof, operatively interconnecting said biasing means to said first end of said rod means, forming said biasing means to tend to move said rod means away from said open end of said tubular member, and forming said second end of said rod means to have shoulder means compacting said polymeric member against said abutment means of said tubular member to tend to compress said tubular member between said abutment means and said free end thereof toward said housing means.

6. A method of making a unit as set forth in claim 5 and comprising the steps of forming said free end of said tubular member to have thread means, and forming said housing means to have thread means threaded to said thread means of said tubular member to secure the same together.

7. A method of making a unit as set forth in claim 5 and comprising the steps of forming said first end of said rod means to have shoulder means, and disposing said biasing means between said shoulder means of said rod means and said housing means.

8. A method of making a unit as set forth in claim 7 and comprising the steps of forming said biasing means to comprise a spring beam member having opposite ends and an opening passing therethrough intermediate said opposite ends thereof, disposing part of said rod means in said opening in said spring beam member, and engaging said opposite ends of said spring beam member against said housing means.

9. A method of making a unit as set forth in claim 8 and comprising the steps of forming said spring beam member to be normally bowed between said opposite ends thereof, and prestressing said spring beam member into a generally flattened condition thereof between said shoulder means of said first end of said rod means and said housing means.

10. A method of making a unit as set forth in claim 9 and comprising the step of forming said polymeric member to be tubular and receive part of said rod means between said first and second ends thereof therein.

11. A method of making a unit as set forth in claim 10 and comprising the steps of forming said second end of said rod means to be externally threaded, and forming said shoulder means of said rod means to comprise a nut means threaded onto said threaded second end of said rod means and compact said polymeric member against said abutment means.

12. A method of making a unit as set forth in claim 11 wherein the step of prestressing said spring beam member into said generally flattened condition thereof between said shoulder means of said first end of said rod means and said housing means comprises the step of turning said nut means on said second end of said rod means in a direction that moves said rod means in a direction that causes said shoulder means to prestress said spring beam member to said generally flattened condition thereof.

13. A method of making a unit as set forth in claim 12 and comprising the steps of forming said other end of said tubular member that is disposed remote from said housing means to be an open end, inserting means through said open other end means of said tubular member to turn said nut means to prestress said spring beam member, and, thereafter, closing said open other end of said tubular member with closing means.

14. A method of making a unit as set forth in claim 13 and comprising the step of securing said nut means in the turned condition thereof on said rod means before the step of closing said open other end of said tubular member.

* * * * *